United States Patent [19]
Williams

[11] 3,731,880
[45] May 8, 1973

[54] BALL VALVE ELECTROMAGNETIC FUEL INJECTOR

[75] Inventor: Donald L. Williams, Port Clinton, Ohio

[73] Assignee: General Motors Corporation, Detroit, Mich.

[22] Filed: Oct. 8, 1971

[21] Appl. No.: 187,623

[52] U.S. Cl....................................239/585, 251/141
[51] Int. Cl.................................................F16k 31/06
[58] Field of Search......................239/584, 585, 586; 158/28; 261/76; 251/129, 141

[56] References Cited

UNITED STATES PATENTS 3,245,652   4/1966   Roth..................................251/141 X
3,628,767   12/1971   Lombard..........................251/141 X Primary Examiner—Allen N. Knowles
Assistant Examiner—Michael Y. Mar
Attorney—J. L. Carpenter et al.

[57] ABSTRACT

A ball valve electromagnetic fuel injector includes a spring biased low-mass magnetic ball which oscillates with respect to a conical valve seat in the injector case to open and close the fuel supply. A solenoid having a stationary pole piece with a spherical tip recess provides a uniform attractive force in pulling the ball away from the valve seat to the open position in accordance with a fuel metering schedule.

2 Claims, 1 Drawing Figure

PATENTED MAY 8 1973
3,731,880
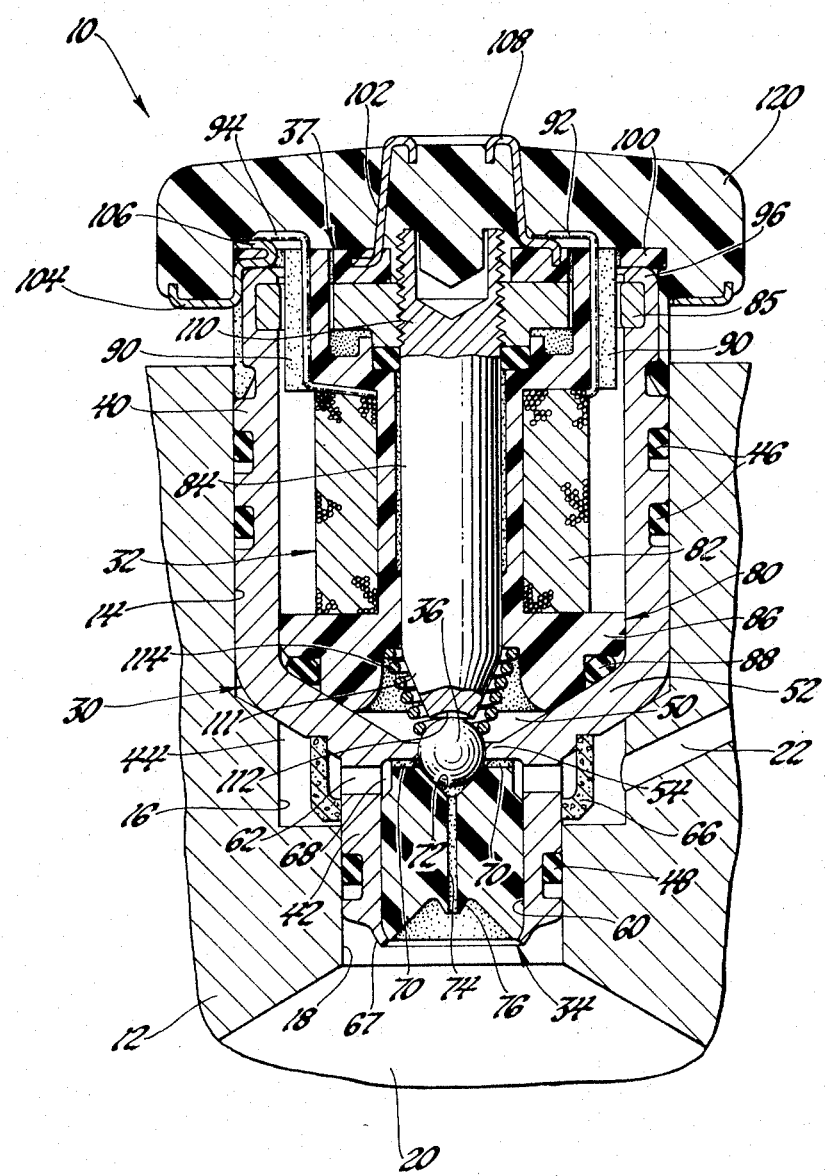
INVENTOR.
Donald L. Williams
BY
Peter D. Sachtjen
ATTORNEY

BALL VALVE ELECTROMAGNETIC FUEL INJECTOR

The present invention relates to fuel injectors and, in particular, to injector valves for electromagnetic fuel injectors used in internal combustion engines.

Fuel injection systems typically incorporate a plurality of fuel injectors, usually one for each cylinder of the engine, which function to meter precisely controlled quantities of atomized fuel to the engine. Generally, these injectors are positioned so as to inject the fuel in a properly timed sequence into the intake manifold upstream of the intake valve associated with the cylinder.

Such injectors oftentimes employ an electromagnetically actuated valve element which serves to open and close the fuel path to the injector nozzle. A typical construction uses an electromagnetically actuated moving part or dynamic mass which, in its external configuration, embodies a valve element that opens and closes against a valve seat. The tip of the moving part incorporates a pintle or nozzle element which establishes an annular orifice downstream of the valve and serves to atomize the pulsing fuel as it emerges from the nozzle orifice. The valve element is provided with only one degree of freedom, axial reciprocation and, to provide proper functioning, the valve element must have surfaces which precisely mate with their associated parts. Thus, the roundness and concentricity of the valve element with respect to the valve seat must be precisely controlled to ensure complete closing of the valve. Similar requirements must apply to the relationships between the pintle and the orifice if complete atomization of the fuel is to be achieved.

The above relationships are also difficult to maintain in service. For instance, the large mass of the valve element results in high impact forces with the valve seat which deforms and wears the seat causing premature leakage and loss of flow control. Additionally, the system requires large electromagnetic and spring forces which tend to increase the valve response time and thus decrease the fuel metering accuracy.

The present invention overcomes the aforementioned difficulties by providing an electromagnetically operated valve for a fuel injector that incorporates a low-mass valve element having an inherently precise seating with the valve seat and an improved response time. More particularly, the injector includes a valve case including a nozzle having a conical valve seat terminating with a circular axial orifice. A precision low-mass magnetizable spherical ball is axially guided by the case relative to the valve seat. A helical coiled spring biases the ball to a normally closed position. A solenoid in the case includes a stationary pole piece having a tip provided with a spherical recess in which the ball seats. The recess establishes a uniform gap with the outer surface of the ball to provide a uniform magnetic force for attracting the latter upon energization of the solenoid coil. The pole piee is axially adjustable relative to the ball to provide a value response time in accordance with the desired fuel schedule. The spherical shape of the ball and the conical shape of the valve seat can be precisely controlled thereby imposing less demanding production requirements than in the aforementioned construction. The ball and the valve seat are inherently self-centering and provide added degrees of freedom in positioning the ball with respect to the valve seat and the pole piece. Additionally, the dynamic mass is minimized thereby providing an injector having a faster response time and improved fuel metering accuracy. In operation, fuel flows through through tangential slots in the nozzle upstream of the valve. The slots impart a swirl motion that directly atomizes the fuel at the nozzle tip and eliminates the need for a valve element and a pintle at a location external of the injector.

The above and other features of the present invention will be apparent to one skilled in the art upon reading the following detailed description, reference being made to the accompanying drawing illustrating a preferred embodiment wherein the single FIGURE is a cross sectional view of a ball valve electromagnetic fuel injector made in accordance with the present invention.

Referring to the drawing, a fuel injector 10 is mounted within a stepped bore in the intake manifold 12 of an internal combustion engine. The bore comprises an upper section 14, a middle section 16, and a lower section 18, the latter of which terminates at the induction passage 20 of the intake manifold 12. Fuel is fed to the injector 10 through a port 22 which communicates with the middle section 16. The injector 10 is controlled in a conventional manner to meter fuel entering through the port 22 and to inject precise quantities of atomized fuel to the manifold 12.

The injector generally comprise an injector case 30, a solenoid 32, a nozzle 34, a ball 36, and an electrical contact assembly 37.

The case 30 is generally designed to permit direct unoriented insertion into the bore and comprises an enlarged body 40 terminating at its lower end in a lower section or nose 42 of reduced diameter. The body 40 is received in the upper section 14 and the nose 42 is received in the sections 16 and 18. The nose 42 defines with the section 16 an annular fluid chamber 44. The outer surface of the body 40 includes a pair of axially spaced annular grooves, each of which contains an O-ring 46. The O-rings 46 effect a seal between the case 30 and the upper section 14 of the bore. The nose 42 includes an annular groove retaining an O-ring 48 which provides a seal at the lower section 18 of the bore.

The configuration of the case 30 is suitably shaped and proportioned so as to be easily fabricated by cold extrusions. The oriented grain flow inherent in the extrusion process provides an improved magnetic permeability for the casing. Preferably, the case 30 is formed of a low carbon steel or a 3 to 4 percent silicon transformer steel.

The case 30 is additionally provided with an upwardly opening cavity 50 housing the solenoid 32. The cavity 50 includes a conical lower portion 52 terminating with an annular flux guide 54 having a circular opening for guiding the axial oscillating movement of the ball 36.

The nose 42 of the case 30 is provided with a downwardly opening cavity 60. A plurality of radial ports 62 formed in the nose 42 exteriorally communicate with the chamber 44 and interiorally communicate with the cavity 60. An annular fuel filter 66 formed of a porous, sintered bronze peripherally surrounds the ports 62. The filter 66 is pressed fitted over the nose 42 and serves to filter contaminants from the entering fuel. 34.cc The nozzle 34 is generally cylindrical and may be injection molded of a suitable plastic material such as polyacetal plastic. The nozzle 34 is inserted in the cavity 60 and the end rim 67 of the nose 42 is spun inwardly to retain the nozzle 34 therein. The upper section of the nozzle 34 has a reduced diameter and defines with the inner surface of the cavity 60 an annular fuel chamber 68. The upper face of the nozzle 34 includes a plurality of radially extending slots 70 and a central conical valve seat 72. If desired, the slots 70 may be tangentially oriented with respect to the valve seat 72 to impart a circumferential swirling motion to the entering fuel. The apex of the valve seat 72 communicates with a circular axial orifice 74 which discharges at the tip 76 of the nozzle 34.

The ball 36 is formed of a magnetizable steel and has a highly finished exterior which is inherently round and provides a positive seal with the valve seat 72.

The solenoid 32 comprises a coil bobbin 80 supporting a coil 82, and a pole piece 84 adjustably carried on a base plate 85. The coil bobbin 80 is housed within the cavity 50 and includes a lower section 86 which engages the case 30 to axially position the solenoid 32. The pole piece 84 is coaxially located with respect to the orifice 74 in a central bore on the bobbin 80. An O-ring 88 provides a seal between the bobbin 80 and the case 30. The upper section of the coil bobbin 80 includes two upwardly extending slotted studs 90 which project through apertures in the base plate 85. The coil 82 includes lead wires 92 and 94 that extend upwardly through the slots in the studs 90. The upper rim 96 of the case 30 is spun over the base plate 85 to lock the solenoid 32 in place.

The contact assembly 37 comprises a circular contact plate 100, an annular contact ring 102, and a cup-shaped grounding ring 104. The contact plate 100 is formed of a nonconductive material and includes a central aperture and diametrically opposed apertures which register with the studs 90. The grounding ring 104 surrounds the case 30 and is attached to the outer periphery of the plate 100 at tangs 106. The contact ring 102 has a lower end embedded in the contact plate 100 and an upper end terminating at a circular rim 108. The contact assembly 37 is positioned on the rim 96 and located thereon by the studs 90. The lead wire 92 is welded to the contact ring 102. The lead wire 94 is welded to the grounding ring 104.

The pole piece 84 includes a threaded end 110 which is adjustably threaded trough the base plate 85. The lower end or tip 111 of the pole piece 84 is provided with a spherical recess 112 that conforms to the shape of the ball 36. A helically coiled spring 114 interposed between the ball 36 and the coil bobbin 80 normally biases the ball 36 into the seating relationship with the valve seat 72. The spherical surface of the recess 112 in cooperation with the outer surface of the ball 36 provides uniform magnetic field for attracting the ball. The pole piece 84 is axially adjustable with respect to the ball 36 and valve seat 72 to provide the desired response time between the open and closed positions.

Following flow setting of the valve assegbly, the contact assembly 37 and the case 30 are encapsulated by an injection molded end cap 120 which serves to seal the interior of the case 30, permanently secure the rings 102, 104, and provide an anti-rotation lock for the pole piece 84. By means of a suitable connector and hold down device which engages the lower surface f the grounding ring 102 and top surface of the rim 108 for holding the injector 10 in position on the manifold 2, the injector 10 is connected in a conventional circuit for energizing the solenoid 32 in accordance with a predetermined schedule.

In operation, the ball 36 is normally biased to the closed position into the seating engagement with the valve seat 72 by the spring 114 and the hydraulic fuel pressure in cavity 50. This closes the fuel path between the fluid chamber 44, the ports 62, the interior passage defined by the chamber 68 and the slots 70, and the orifice 74. Upon receiving an electrical impulse from the control unit, the coil 82 of the solenoid 32 is energized thereby magnetizing the pole piece 84 and applying a uniform attractive force to the ball 36 sufficient to overcome the force developed by the pressure of the fuel plus the biasing force of the spring 114. This causes the ball 36 to shift upwardly against the pole piece 84 in seating engagement in the recess 112 and opens the valve thus allowing the fuel to flow through the port 22, the chamber 44, the ports 62, the slots 70, and the orifice 74. The fuel emerges at the tip 76 in a finely atomized form and continues as long as the solenoid 32 is energized. Upon termination of the electrical impulse, the coil 82 is deenergized causing the magnetic field to collapse and the spring and the hydraulic forces cause the ball 36 to seat against the valve seat 72 thereby shutting off the flow of fuel until the next electrical impulse.

Although only one form of this invention has been shown and described, other forms will be readily apparent to those skilled in the art. Therefore, it is not intended to limit the scope of this invention by the embodiment selected for the purpose of this disclosure but only by the claims which follow.

What is claimed is:

1. An electromagnetic fuel injector comprising: an injector case having a fuel inlet; a nozzle carried by said case and having an axial fuel outlet; passage means between said inlet and said outlet defining a fuel path through said case; a conical valve seat in said passage means communicating with said outlet; a spherical magnetizable ball supported in said case for oscillation between a first position seated against said valve seat for closing said fuel path and a second position remote from said valve seat for opening said fuel path; spring means between said ball and said case for biasing said ball to said first position; a solenoid in said case including a stationary magnetizable pole piece having a spherical recess at one end thereof spaced from said valve seat, said ball seating in said recess in said second position and maintaining a constant gap with said recess in said first position whereby said pole piece applies a uniform attractive force to said ball when said solenoid is energized to shift said ball to said second position against the biasing force of the spring means thereby opening said fuel path.

2. A ball valve electromagnetic fuel injector comprising: an injector case; a fuel inlet port in said case; a nozzle mounted on one end of said case; a circular axial orifice formed in said nozzle; a conical valve seat formed in said nozzle coaxial with said orifice; a passage in said case fluidly connecting said inlet port and said orifice; an annular guide member on said case aligned with the orifice and the valve seat; a low mass spherical magnetizable ball in said case restrained by said guide member for axial movement between a closed position against said valve seat and an open position remote from said valve seat; a spring engaging said ball and said case for biasing said ball to said closed position; a solenoid mounted at the other end of said case; a stationary magnetizable pole piece on said solenoid coaxial with said valve seat; a spherical recess at one end of said pole piece spaced from said valve seat and adapted to seat said ball in said open position, said recess maintaining a constant gap with said ball for applying a uniform attractive force to whereby magnetizing said pole piece applies said uniform attractive force to said ball to shift the latter to the closed position to said recess against the biasing force of the spring thereby opening a fuel path through said injector.

* * * * *